J. Vail,
Automatic Gate,
N° 64,924.    Patented May 21, 1867.

Witnesses,
Theo Tusche
Wm Trewin

Inventor
Jacob Vail
per Munn & Co atty

United States Patent Office.

JACOB VAIL, OF BELOIT, WISCONSIN, ASSIGNOR TO HIMSELF AND JOHN H. LINDERMAN, OF THE SAME PLACE.

*Letters Patent No. 64,924, dated May 21, 1867.*

GATES.

The Schedule referred to in these Letters Patent and making part of the same.

TO ALL WHOM IT MAY CONCERN:

Be it known that I, JACOB VAIL, of Beloit, in the county of Rock, and State of Wisconsin, have invented a new and useful improvement in Gates; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved gate, strong, simple, and durable, and which may be opened and closed by the driver without getting out of the vehicle; and it consists in the arrangement of cords and pulleys, by means of which the gate may be opened and closed from the vehicle; in making one of the boards or horizontal bars of the gate act as a latch or sliding catch to fasten the gate open and shut; in the combination of a coiled spring, or its equivalent, with the sliding bar or board, for the purpose of holding it forward; and in the combination of a pivoted lever with the gate sliding bar and operating cords, the whole being constructed and arranged as hereinafter more fully described.

Figure 1:
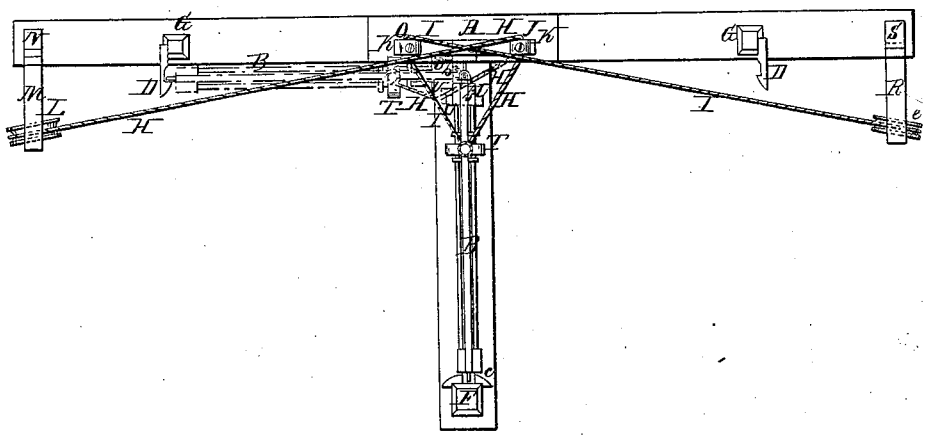
Figure 1 is a top view of my improved gate closed, and showing in red lines its position when open.
Figure 2:
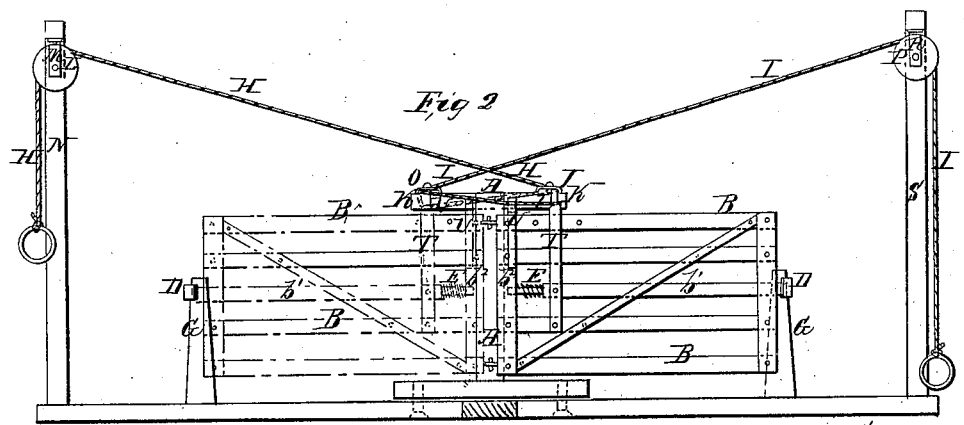
Figure 2 is a side view of my improved gate when open.

A is the rear gate-post, to which the gate B is hung in the ordinary manner. The gate B is made in the ordinary manner, except that one of its middle horizontal bars, as $b^1$, is so made as to slide longitudinally, so as to act as a catch or latch to fasten the gate open and shut. The bar $b^1$ is held forward in proper position to catch upon the catches C and D by a coiled spring, E, coiled around its rear end, with its rear end resting against the rear vertical cross-bar $b^2$ of the gate, and with its front end resting against shoulders formed upon, or a stop pin attached to, the said bar $b^1$, as shown in fig. 2. F is the front post, to which the catch C is attached, for holding the gate shut; and G are side posts, to which the catches D are attached, for holding the gate open. The gate B is opened and closed by means of the cords H and I, one end of which is attached to the upper part of the gate; thence the cord H passes around a pulley, J, pivoted to the end of the horizontal arm K, attached to the top of the post A, in a position at right angles to the line of the gate when closed; thence it passes over a pulley, L, pivoted to the end of the horizontal arm M, attached to the end of the post N, and extends down into such a position that it can be reached and operated for opening or closing the gate by the driver without getting out of the vehicle. In a similar manner the cord I passes around the pulley O, pivoted to the end of the arm K, and over the pulley P, pivoted to the end of the arm R, attached to the top of the post S. The posts N and S should be of such a height as to bring the ends of the ropes H and I into a convenient position for being reached and operated. By this arrangement of the cords and pulleys the gate B will always be opened from the operator, in whatever direction he may be going; but if, from any cause, it is desired that the gate should swing only in one direction, one of the cords, as H, should be passed around the other side of the pulley J, and thence over a pulley attached to the arms R; then, by pulling upon the rope H, thus arranged, the gate will be opened towards the operator. In the same way, two cords may be arranged at the other side of the gate, so that the gate may be always opened in the same direction from either side. When the ends of the ropes H and I are attached directly to the upper part of the gate, the upper hinge and gate-latch should be so constructed that the first effect may be to unfasten the gate, and the second to swing it open or shut; but when the gate is fastened by means of the sliding bar $b^1$, as hereinbefore described, the ends of the cords H and I should be attached to the upper end of the lever T, the lower end of which is pivoted to the gate B below the sliding bar $b^1$. The sliding bar $b^1$ is also pivoted to the said lever T, and the movement of the upper end is limited to the amount necessary to unfasten the gate by stop pins attached to the upper horizontal bar of said gate. By this arrangement of the lever T the first effect of pulling upon the cords H and I will be to draw back the bar $b^1$, unfastening the gate, and the second effect will be to swing the gate open or shut. U are arms, attached to the rear part of the gate, and extending upward, so as to give the operating cords H and I the necessary leverage to swing the gate shut when open, as shown in red in fig. 1.

What I claim as new, and desire to secure by Letters Patent, is—

1. The arrangement of the cords H and I and pulleys J L O P with each other and with the gate B, for the purpose of opening and closing said gate, substantially as herein shown and described.

2. Making one of the horizontal boards or bars of the gate act as a sliding latch, substantially as herein shown and described and for the purpose set forth.

3. The combination of the coiled spring E, or its equivalent, with the sliding bar $b^1$, substantially as herein shown and described.

4. The combination of the pivoted lever T with the gate B, sliding bar $b^1$, and operating cords H and I, substantially as herein shown and described and for the purpose set forth.

JACOB VAIL.

Witnesses:
    WM. E. WHEELER,
    J. C. CONVERSE.